(12) United States Patent
Iordanou

(10) Patent No.: US 9,862,426 B2
(45) Date of Patent: Jan. 9, 2018

(54) VEHICLE SPLASH GUARD AND METHOD OF PAINTING SAME

(71) Applicant: Bill Iordanou, Linden, MI (US)

(72) Inventor: Bill Iordanou, Linden, MI (US)

(73) Assignee: Quality Engineering Company, Wixom, MI (US)

( * ) Notice: Subject to any disclaimer, the term of this patent is extended or adjusted under 35 U.S.C. 154(b) by 0 days.

(21) Appl. No.: 15/283,740

(22) Filed: Oct. 3, 2016

(65) Prior Publication Data

US 2017/0096176 A1    Apr. 6, 2017

Related U.S. Application Data

(60) Provisional application No. 62/235,819, filed on Oct. 1, 2015.

(51) Int. Cl.
*B62D 25/18* (2006.01)
*B05B 15/04* (2006.01)

(52) U.S. Cl.
CPC ............ *B62D 25/18* (2013.01); *B05B 15/045* (2013.01)

(58) Field of Classification Search
CPC ..... B62D 25/18; B62D 25/182; B62D 25/188
See application file for complete search history.

(56) References Cited

U.S. PATENT DOCUMENTS

| 4,709,938 | A | | 12/1987 | Ward | |
|---|---|---|---|---|---|
| 4,927,177 | A | * | 5/1990 | Price | B62D 25/18 280/851 |
| 5,722,690 | A | * | 3/1998 | Ward | B62D 25/18 280/851 |
| 6,193,278 | B1 | | 2/2001 | Ward | |
| 6,729,652 | B2 | * | 5/2004 | Cicansky | B62D 25/188 280/152.3 |
| 7,114,749 | B2 | * | 10/2006 | Ward | B62D 25/18 280/154 |
| 8,651,528 | B2 | * | 2/2014 | Earl | B62D 25/18 280/847 |
| 9,016,912 | B1 | * | 4/2015 | Gustafson | B60Q 1/0088 362/485 |
| 9,022,428 | B2 | * | 5/2015 | Balasundaramohan | B62D 25/18 280/848 |
| 2003/0151243 | A1 | * | 8/2003 | Horinek | B62D 25/18 280/848 |

(Continued)

*Primary Examiner* — Hau V Phan
(74) *Attorney, Agent, or Firm* — The Weintraub Group, P.L.C.

(57) ABSTRACT

The present invention is, in a first aspect, a two-piece vehicular splash guard assembly including a splash guard body, having at least one slit, and a cover, having at least one tab corresponding to and registerable with the at least one slit. Removably securing the cover about an interior surface of the splash guard body, either before or after painting the splash guard body, ensures that no paint bleeds onto the inside surface of the splash guard body during the manufacturing process. In a second aspect, a method of painting said splash guard assembly is provided in order to create fine paint lines along the edges of the splash guard body. The cover may be attached either prior to or after painting and, thereafter, the combined cover and splash guard body may be attached to a vehicle or, alternatively, the splash guard body alone may be attached to the vehicle.

12 Claims, 8 Drawing Sheets

(56) References Cited

U.S. PATENT DOCUMENTS

2013/0106089 A1* 5/2013 Balasundaramohan B62D 25/18
                                                     280/851
2013/0161935 A1* 6/2013 Ward ................... B62D 25/182
                                                     280/851

* cited by examiner

VEHICLE SPLASH GUARD AND METHOD OF PAINTING SAME

CROSS-REFERENCE TO RELATED APPLICATION

This application is a completion application and which claims the priority benefit of U.S. Provisional Patent Application Ser. No. 62/235,819, filed Oct. 1, 2015, for "VEHICLE SPLASH GUARD AND METHOD OF PAINTING SAME," the entire disclosure of which is hereby incorporated by reference in its entirety, including the drawing.

BACKGROUND OF THE INVENTION

1. Field of the Invention

The present invention pertains to vehicular splash guards and a method of painting the splash guards.

2. Description of Prior Art

As vehicles are driven, a number of objects such as water, rocks, dirt, road tar, and other foreign objects may be propelled onto the exterior of the vehicle which can do costly damage to the components on the undercarriage of the vehicle in addition to damaging the paint along the sides of the vehicle. Furthermore, these damaging objects may project rearwardly, thereby damaging any vehicles to the rear of the driven vehicle and endangering other drivers on the road. Repairs for such damage to a vehicle's paint, windshield, or parts beneath the vehicle may easily run in the hundreds, if not thousands, of dollars.

One preventative method for maintaining the quality of the vehicle is to install splash guards behind each wheel of the vehicle's body and, typically, in the wheel well, rearward of the front, rear, or both sets of tires. Splash guards are well known and commercially available are typified in the prior art such as disclosed in U.S. Pat. Nos. 4,709,938 and 6,193,278, and U.S. Patent Publication Serial No. 2013/0161935, the disclosures of which are hereby incorporated by reference.

U.S. Pat. No. 4,709,938, filed Nov. 18, 1985, teaches a splash guard formed from a sufficiently elastic material which permits deformation during installation, but which is sufficiently inelastic to substantially retain its shape once installed on a vehicle. However, this reference fails to teach a cover to facilitate painting, but, instead, teaches a wheel well flange cover when in use.

U.S. Pat. No. 6,193,278, filed Apr. 13, 1999, teaches a two-piece splash guard including a mounting component and a contoured member. The contoured member acts as a removable cover for a top portion of the mounting component such that when the mounting component and contoured member are secured together, the splash guard provides the appearance of a unitary, custom molded splash guard. The cover does not conceal an entire surface of the mounting component in order to provide fine paint lines.

U.S. Patent Publication Serial No. 2013/0161935, filed Dec. 22, 2011, discloses a splash guard having an inside panel and an outside panel. The outside panel defines a partial cover which cooperates with the inside panel to provide a pocket therebetween. The cover assists in the installation process of the splash guard to a vehicle.

Further, as known to those skilled in the art, a large number of newly manufactured vehicles have splash guards installed at the dealership behind both the front and rear wheels as an original vehicle part or as an OEM part. Typically, these splash guards are molded from a durable thermoplastic polyolefin material or similar durable thermoplastic such as high-density polyethylene (HDPE), acrylonitrile (ABS), thermoplastic polyurethane (TPU), or the like.

Oftentimes, splash guards are installed as an aftermarket part. Thus, either as an OEM or an aftermarket part, splash guards have become an often used part of the vehicle.

As an OEM or aftermarket part, splash guards must be manufactured in accordance with the automobile company's design specifications. As such, these splash guards must adhere to strict manufacturing specifications. Thus, for aesthetic purposes, such design specifications for splash guards usually require that the non-tire facing side of the splash guard be painted without allowing the paint to bleed onto the opposite or tire side of the splash guard. This provides precisely painted edges or fine line painted edges on the non-tire facing side.

Requiring such strict guidelines causes the manufacturing process of these splash guards to be a very tedious and time consuming process. To accomplish this, each splash guard must be taped or masked at its edges to make sure that no paint bleeds onto the opposite side, similar to using painter's tape when painting a wall to ensure well-defined edges. After painting the splash guard, the tape/mask is then removed to reveal fine paint lines along its edges.

However, heretofore, the art has not addressed the painting of the splash guards to create fine paint lines by removing a cover. A need, therefore, exists to accelerate the painting process while still adhering to OEM specifications.

It is to this to which the present invention is directed.

The above references are identified herein in recognition of a duty of disclosure of related subject matter, which may be relevant under 37 CFR 1.56, and specifically incorporated, herein by reference as regards the conventional approaches and constructions taught therein.

SUMMARY OF THE INVENTION

The present invention provides, in a first aspect, a two-piece splash guard assembly for a vehicle, the splash guard assembly, comprising: (a) a splash guard body, the splash guard body having an inside surface, an outside surface, a first edge, a second edge, a top edge, a bottom edge, and a perimetral body edge, the splash guard body further including at least one body aperture for attaching the splash guard body to a vehicle; (b) a cover, the cover having an inside surface, an outside surface, a first edge, a second edge, a top edge, a bottom edge, and a perimetral cover edge, the inside surface of the cover being substantially complementary to the inside surface of the splash guard body, the cover further including at least one cover aperture for attaching the cover to the vehicle; and (c) means for removably securing the cover to the splash guard body.

The means for removably securing the cover to the splash guard body comprises at least one and, preferably, a plurality of slits formed along the perimetral body edge and at least one and, preferably, a plurality of tabs disposed along the perimetral cover edge, each tab being in registry with an associated slit. The slits and tabs cooperate to removably secure the cover to the splash guard body.

To join the cover to the splash guard body, the cover is positioned over the splash guard body, within the confines of the perimetral body edge, wherein the inside surface of the cover faces and mates with the inside surface of the splash guard body. The tabs are then inserted into an associated slit in order to removably secure the cover to the splash guard. The cover may be removed from the splash guard body by disengaging the tabs from within each associated slit.

The at least one body aperture and at least one cover aperture cooperate to attach either the splash guard body, alone, or the combined splash guard body and combined to the vehicle, behind each wheel.

In a second aspect hereof, the present invention provides a method for painting a two-piece splash guard assembly to ensure that no paint bleeds to an undesired surface of the splash guard assembly.

In a first embodiment of the present method hereof, the method comprises the steps of: (a) providing a splash guard body having a perimetral body edge; (b) providing a cover for the splash guard, the cover being substantially complementary to the splash guard body; (c) removably securing the cover to the splash guard body; (d) painting at least a portion of the splash guard body not concealed by the cover; (e) removing the cover from the splash guard body after painting, wherein removing the cover reveals fine paint lines along the perimetral body edge of the splash guard body; and (f) attaching the splash guard body to a vehicle without the cover.

Alternatively, and in a second embodiment of the present method hereof, the method comprises the steps of: (a) providing a splash guard body having a perimetral body edge; (b) painting at least a portion of the splash guard body; (c) providing a cover for the splash guard body, the cover being substantially complementary to the splash guard body; (d) removably securing the cover to the splash guard body after painting to provide the appearance of fine paint lines along the perimetral body edge of the splash guard body; and (e) attaching the splash guard body and the cover to a vehicle.

For a more complete understanding of the present invention, reference is made to the following detailed description and accompanying drawing. In the drawing, like reference characters refer to like parts throughout the several views in which:

DESCRIPTION OF THE INVENTION

Figure 1:
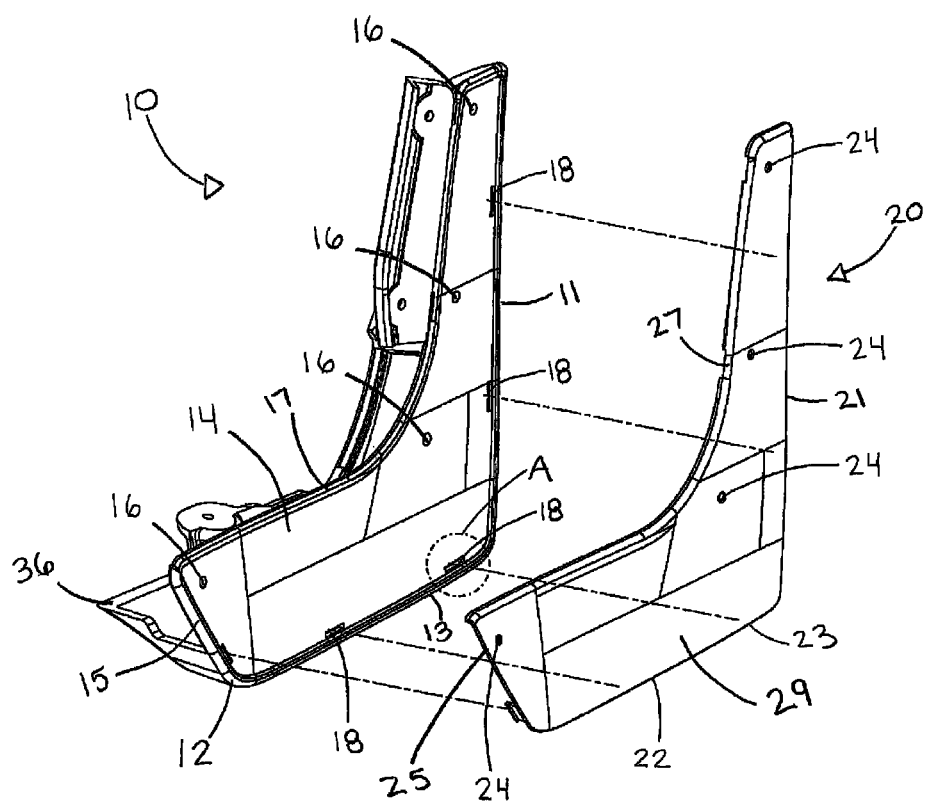
FIG. 1 is an exploded, front perspective view of a splash guard assembly in accordance with the present invention.

As noted hereinbelow, the present invention, generally, comprises, in a first aspect, a two-piece splash guard assembly which creates distinct and fine paint lines along an edge of the splash guard assembly when painted and, in a second aspect, a method of painting a two-piece splash guard assembly for creating fine paint lines and securing the splash guard assembly to a wheel well of a vehicle.

At the outset, it should be noted that although the ensuing description of a splash guard assembly is made with reference to that shown in the drawing, it is to be understood that the present invention is applicable to any configuration and/or geometry of the splash guard assembly and such is within the scope of the present invention.

Now, and with reference to FIGS. 1-8 of the drawing, and in accordance with the first aspect hereof, there is shown therein a two-piece splash guard or splash guard assembly, denoted at 8, which, generally, comprises: (a) a splash guard body 10; (b) a cover 20; (c) and means for removably securing the cover 20 to the splash guard body 10.

Figure 2:
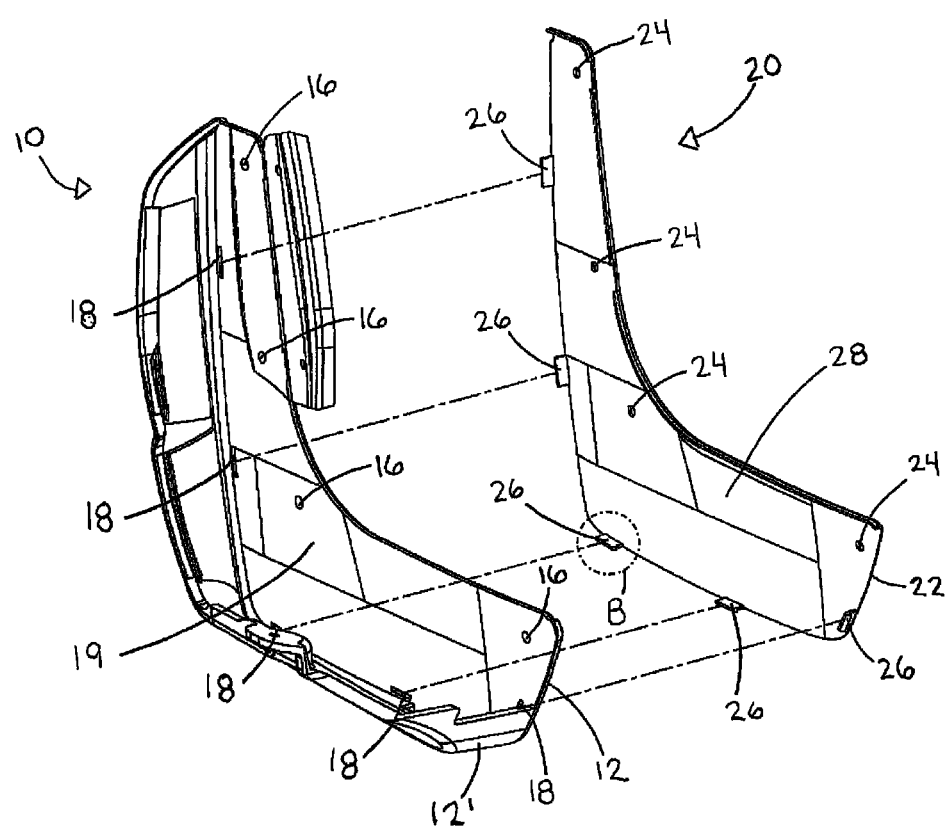
FIG. 2 is an exploded rear perspective view of the splash guard assembly hereof.
Figure 3:
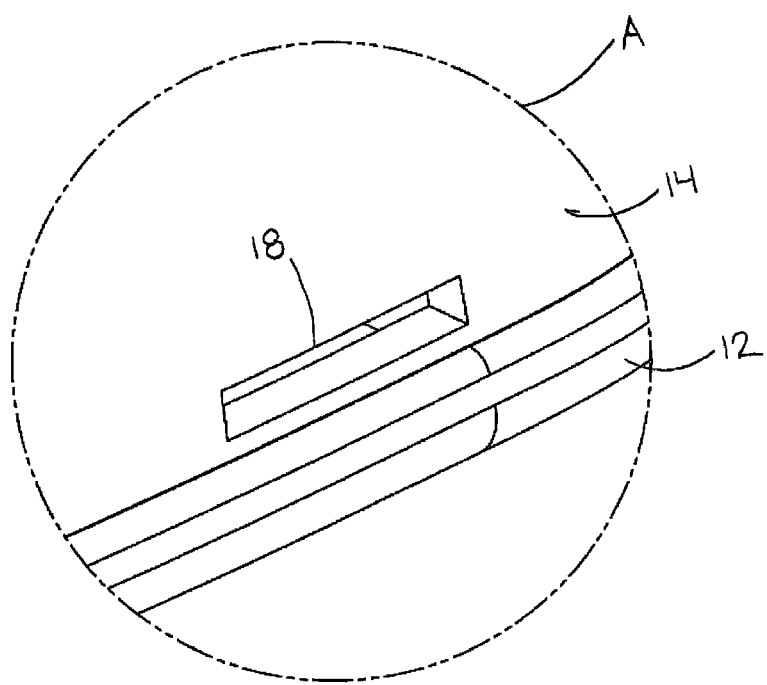
FIG. 3 is an enlarged view of a slit as shown within circle A of FIG. 1.
Figure 5:
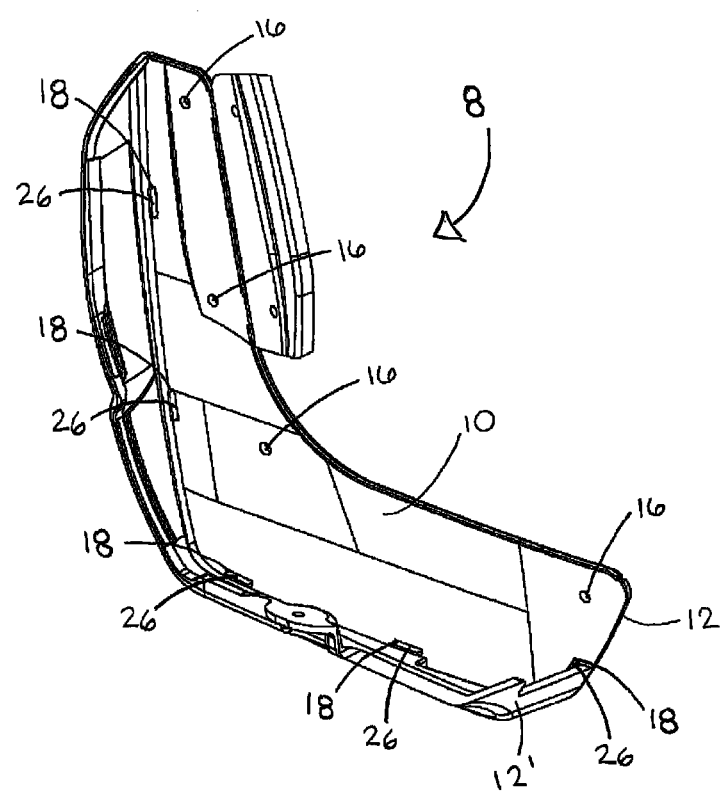
FIG. 5 is a rear perspective view of the splash guard assembly hereof.
Figure 6:
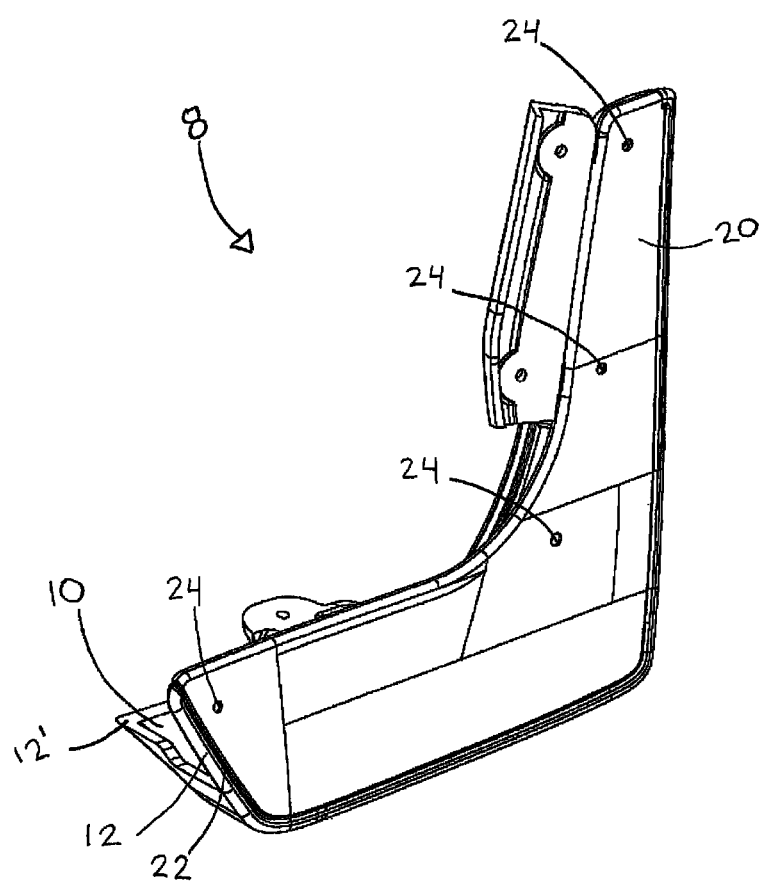
FIG. 6 is a front perspective view of the splash guard assembly hereof.

As shown in FIGS. 1, 2, and 5, the splash guard body 10 comprises a planar member having an exterior or outside face or surface 19 and an interior or inside body face or surface 14. As shown, the splash guard body 10 is defined by a first substantially linear side wall or edge 11, a bottom wall or edge 13, a second substantially linear side wall or edge 15, and an arcuate or top wall or edge 17 which interconnects the two side walls 11, 15 to provide an integrally formed or unitary splash guard body 10. The splash guard body 10 has a perimetral body edge or wall 12 which defines a width 34. The perimetral body edge 12 extends outwardly from the outside face 19 of the splash guard body 10 along the first side wall 11 and the bottom wall 13 to define a rim 36.

At least one first or body aperture 16 is formed on the splash guard body 10 that cooperates with a suitable fastener, such as threaded fastener or the like (not shown), that permits attachment of the splash guard body 10 to the body of a vehicle at the rear of a wheel well and behind a tire. Preferably, a plurality of body apertures 16 are formed on the splash guard body 10.

As shown in FIGS. 1, 3, 5, and 8, at least one slit 18 is formed within the splash guard body 10 proximate the perimetral body edge 12. Preferably, a plurality of slits 18 is employed wherein each one of the plurality of slits 18 is intermittently spaced apart from one another along the perimetral body edge 12. The slits 18 permit the cover 20 to be removably secured to the splash guard body 10 as discussed hereinbelow. According to this configuration, each slit 18 of the splash guard body 10 is a substantially rectangular cutout extending through the entire width 34 of the splash guard body 10. While the slit 18 need not be rectangular, it merely needs to permit an associated similar sized tab 26, as described below, to fit therewithin and extend therepast. Although the slits 18 are described as being proximate the perimetral body edge 12, it is to be understood that the slits 18 may be provided in any convenient and/or appropriate position on the splash guard body 10.

As shown in FIGS. 1, 2, 6, and 7, the cover 20 comprises a planar member having an exterior or outside face or surface 29 and an interior or inside body face or surface 28. As depicted herein, the cover 20 is further defined by a first substantially linear side wall or edge 21, a bottom wall or edge 23, a second substantially linear side wall or edge 25, and an arcuate or top wall or edge 27 which interconnects the two side walls 21, 25 to provide an integrally formed unitary cover 20. The cover 20 has a perimetral cover edge or wall 22 which defines a width 36. The shape and size of the inside surface 29 of the cover 20 is constrained to abut against the inside surface 19 of the splash guard body 10 immediately within the perimetral body edge 12, thereby being substantially complementary to one another.

At least one second or cover aperture 24 is provided on the perimetral cover edge 22 and is in registry with the at least one body aperture 16 allowing for the splash guard body 10 and the cover 20 to be jointly fastened to the wheel well of a vehicle. Preferably, a plurality of cover apertures 24 are employed, each in registry with an associated one of the plurality of body apertures 16.

The cover 20 further comprises at least one tab 26 that projects outwardly from the inside surface 28 of the cover 20. Preferably, a plurality of tabs 26 is employed. Each tab 26 corresponds to an associated slit 18 on the splash guard body 10.

Figure 4:
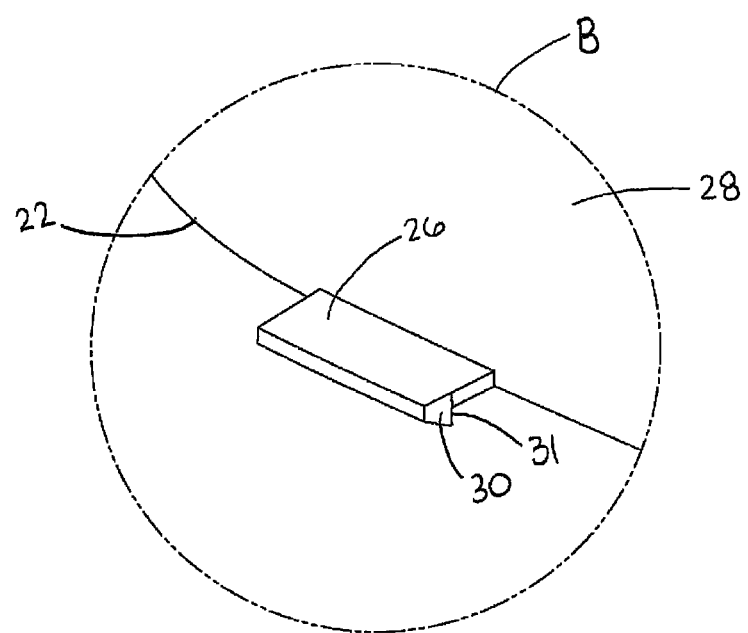
FIG. 4 is an enlarged view of a tab as shown within circle B of FIG. 2.
Figure 8:
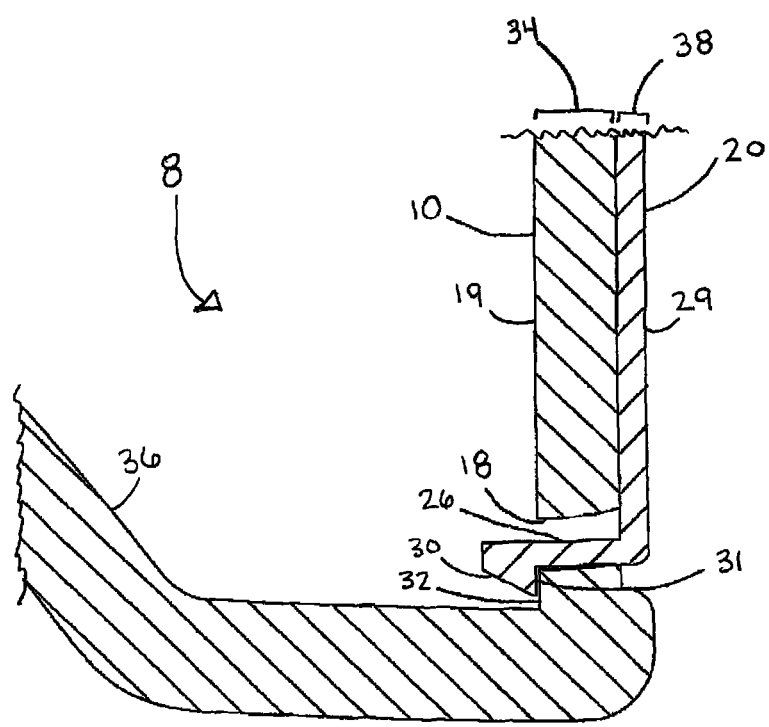
FIG. 8 is a cross-sectional view of the splash guard assembly hereof taken along line C-C of FIG. 7.

As shown in FIGS. 4 and 8, each tab 26 terminates at a downwardly facing, truncated, angular lip 30, having an undersurface 31, permitting the tab 26 to engage the edges of an associated slit 18 on the splash guard body 10. The tab 26 extends through the associated slit 18 becoming secured therein. Each slit 18 cooperates with the interior surface 28 of the splash guard body 10 to define a seat 32 at which the undersurface 31 of an associated tab 26 rests against to removably secure the cover 20 to the splash guard body 10. Thus, the tabs 26 and slits 18 act cooperatively to detachably secure the cover 20 to the splash guard body 10.

In order to remove the cover 20 from the splash guard body 10, where each one of the plurality of tabs 26 is disposed within an associated slit 18, the user individually disengages each lip 30 of a tab 26 from its seated position in any appropriate manner, such as lifting the lip 30 from the seat 32 using a lever, finger, or the like, and the tabs 26 are then free to slide out of the associated slit 18.

It is possible for the slits 18 and tabs 26 to have different cooperative geometries, other than as shown, such as the lip 30 being angled upwardly, tapered, or otherwise depending on the splash guard geometry, specifically the geometry of the slits 18. While the means for removably securing the cover 20 to the splash guard body 10 is described as a plurality of slits and tabs above, it is understood that any other suitable means for removably engaging is intended to fall within the scope of the present invention without deviating therefrom.

Figure 7:
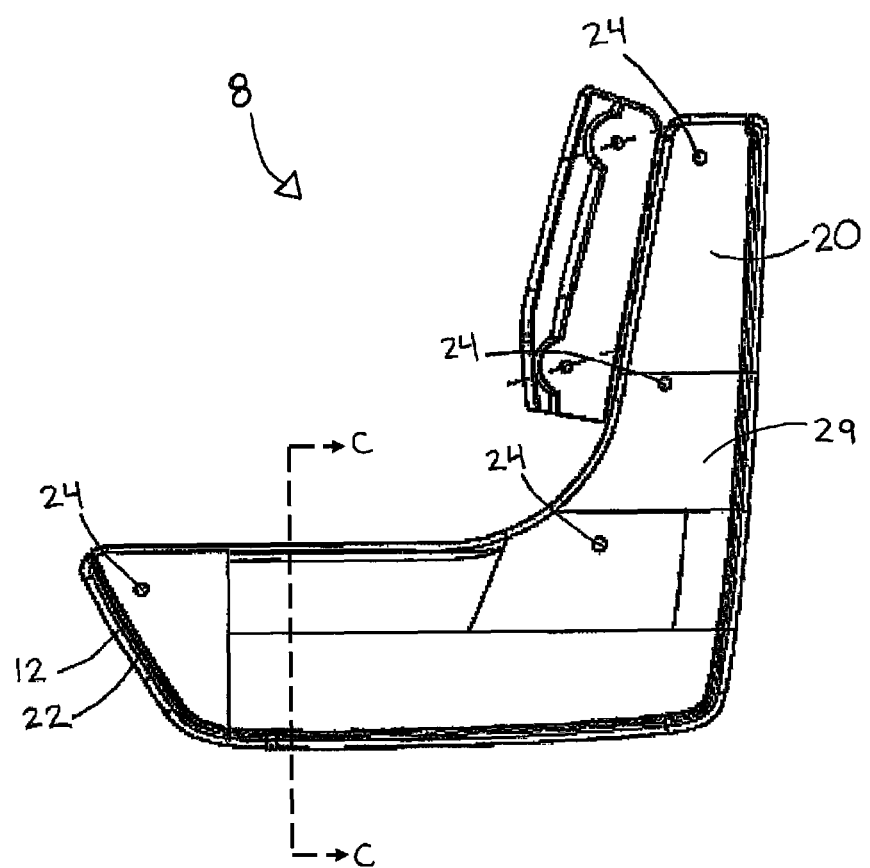
FIG. 7 is a front view of the splash guard assembly hereof.

Referring again to the drawing, in particular FIGS. 7 and 8, the cover 20 is removably secured to the splash guard body 10 by being disposed or positioned within the confines of the perimetral body edge 12, such that the inside surface 28 of the cover 20 mates with the inside surface 14 of the body 10. Each tab 26 is then positioned within its associated slit 18. When the cover 20 is secured to the splash guard body 10, the body apertures 16 align and are in registry with the cover apertures 24 to allow the splash guard body 10 and the cover 20 to be jointly fastened to the vehicle in a wheel well. The splash guard assembly 8, as described hereinabove, is utilized in the method described below.

In the second aspect of the present invention, there is provided a method for painting the two-piece splash guard assembly 8 as described above to create fine paint lines around the perimetral body edge 12 without the need for taping or masking the splash guard.

In a first embodiment of the method hereof, the splash guard body 10 is painted by any suitable technique. Thereafter, the cover 20 is secured to the splash guard body 10 by inserting the tabs 26 on the cover 20 into corresponding slits 18 on the splash guard body 10. By attaching the cover 20 after painting the body 10, this provides the appearance of fine paint lines along the perimetral body edge 12 as the cover 20 conceals any accidental paint spillover or bleeding onto the inside surface 14 of the splash guard body 10. The splash guard body 10 and the cover 20 can then be jointly attached to the rear of each wheel well on a vehicle by way of the body apertures 16 and the cover apertures 24 in registry with one another.

In an alternative or second embodiment of the present method hereof, the cover 20 is secured to the splash guard body 10 prior to painting by inserting the tabs 26 on the cover 20 into the corresponding slits 18 on the splash guard body 10. The splash guard body 10 is, then, painted by any suitable mode. After painting the splash guard body 10, the cover 20 is then detached from the splash guard body 10 by individually lifting the lip 30 of each tab 26, as noted above, and disengaging the tabs 26 from within the slits 18. When the cover 20 is removed, fine paint lines are revealed along the perimetral body edge 12. With the cover 20 detached, the body apertures 16 permit the splash guard body 10, alone, to be attached on the rear of the wheel well of the vehicle.

It is to be understood that, in implementing the above method of painting the two-piece splash guard, any other suitable means for removably securing the cover 20 to the splash guard body 10 and securing either the splash guard body 10 and/or cover 20 to the vehicle may be employed.

From the above, it is to be appreciated that defined herein is a new and unique two-piece splash guard assembly, having a splash guard body and a cover for creating fine paint lines along a perimeter of the splash guard body, and a method for painting the splash guard assembly to create fine paint lines wherein the cover is secured to the splash guard body either prior to or after painting.

LIST OF REFERENCE NUMBERS

8 Splash guard assembly
10 Splash guard body
11 First edge of body
12 Perimetral body edge
13 Bottom edge of body
14 Inside surface of body
15 Second edge of body
16 Body aperture
17 Top edge of body
18 Slit
19 Outside surface of body
20 Cover
21 First edge of cover
22 Perimetral cover edge
22' Width of cover
23 Bottom edge of cover
24 Cover aperture
25 Second edge of cover
26 Tab
27 Top edge of cover
28 Inside surface of cover
29 Outside surface of cover
30 Lip of tab
31 Undersurface of lip
32 Seat of body
34 Width of body
36 Rim of body
38 Width of cover

Having thus described the invention, what is claimed is:

1. A splash guard assembly for a vehicle, the splash guard assembly comprising:
(a) a splash guard body, the splash guard body including an inside surface, an outside surface, a first edge, a second edge, a top edge, a bottom edge, and a perimetral body edge, the splash guard body further including: (i) at least one body aperture for attaching the splash guard body to a vehicle; and (ii) at least one slit formed therewithin; and
(b) a cover, the cover including an inside surface, an outside surface, a first edge, a second edge, a top edge, a bottom edge, and a perimetral cover edge, the cover further including at least one tab disposed on the inside surface thereof, the at least one tab being directly insertable into the at least one slit, the inside surface of the cover being substantially complementary to the inside surface of the splash guard body.

2. The splash guard assembly of claim 1 wherein the at least one slit is substantially rectangular.

3. The splash guard assembly of claim 2 wherein the at least one tab includes a truncated, angular lip that mates with the substantially rectangular slit to secure the cover to the splash guard body.

4. The splash guard assembly of claim 1 wherein the splash guard body further comprises a plurality of slits.

5. The splash guard assembly of claim 4 wherein the cover further comprises a plurality of tabs, each one of the plurality of tabs being registerable with an associated one of the plurality of slits.

6. The splash guard assembly of claim 4 wherein each one of the plurality of slits is formed proximate the perimetral body edge.

7. The splash guard assembly of claim 6 wherein each one of the plurality of tabs is disposed proximate the perimetral cover edge.

8. The splash guard assembly of claim 1 wherein the cover includes at least one cover aperture for attaching the cover to the vehicle, the at least one cover aperture being registerable with the at least one body aperture.

9. The splash guard assembly of claim 1 wherein the splash guard body includes a plurality of body apertures.

10. The splash guard assembly of claim 9 wherein the cover includes a plurality of cover apertures, each one of the plurality of cover apertures being registerable with each one of the plurality of body apertures.

11. A method for creating fine paint lines on a splash guard assembly for a vehicle, the method comprising the steps of:
  (a) providing a splash guard body having a perimetral body edge and at least one slit formed in the splash guard body;
  (b) providing a cover for the splash guard, the cover being substantially complementary to the splash guard body, the cover having an inside surface and at least one tab disposed on the inside surface, the at least one tab being directly insertable into the at least one slit;
  (c) removably securing the cover to the splash guard body;
  (d) painting a portion of the splash guard body not concealed by the cover;
  (e) removing the cover from the splash guard body after painting, wherein removing the cover reveals fine paint lines along the perimetral body edge of the splash guard body, and
  (f) securing the splash guard body to a vehicle without the cover.

12. A method for creating fine paint lines on a splash guard assembly for a vehicle, the method comprising the steps of:
  (a) providing a splash guard body having a perimetral body edge and at least one slit formed in the splash guard body;
  (b) painting the splash guard body;
  (c) providing a cover for the splash guard, the cover being substantially complementary to the splash guard body, the cover having an inside surface and at least one tab disposed on the inside surface, the at least one tab being directly insertable into the at least one slit;
  (d) removably securing the cover to the splash guard body after painting to provide the appearance of fine paint lines along the perimetral body edge of the splash guard body, and
  (e) attaching the splash guard body and the cover to a vehicle.

* * * * *